United States Patent

[11] 3,601,594

| | | | |
|---|---|---|---|
| [72] | Inventor | Leonard A. Carbary<br>Fraser, Mich. | |
| [21] | Appl. No. | 816,974 | |
| [22] | Filed | Apr. 17, 1969 | |
| [45] | Patented | Aug. 24, 1971 | |
| [73] | Assignee | Chrysler Corporation<br>Highland Park, Mich. | |

[54] CIRCUIT CONTROLLER FOR CONCEALED HEADLAMP ACTUATOR APPARATUS
8 Claims, 3 Drawing Figs.

[52] U.S. Cl. ........................................ 240/7.1 H,
317/33, 323/57
[51] Int. Cl. ........................................ B60q 1/06
[50] Field of Search ........................................ 240/7.1 A,
7.1 H; 317/33; 323/57

[56] References Cited
UNITED STATES PATENTS
3,070,687  12/1962  Marchant .................... 240/7.4 (H)
FOREIGN PATENTS
837,610   6/1960  Great Britain ............... 240/7.1 (H)

*Primary Examiner*—Samuel S. Matthews
*Assistant Examiner*—M. L. Gellner
*Attorney*—Harness, Talburtt & Baldwin ABSTRACT: An electrical circuit controller controlling the direction of actuation of a concealed headlamp apparatus including a relay which is energized through the vehicle ignition switch to operate or maintain the apparatus in a headlamp concealing position and is deenergized under the joint control of the vehicle ignition switch and headlamp switch in their enabled condition to operate the apparatus to its headlamp revealing position.

PATENTED AUG 24 1971

3,601,594

INVENTOR.
Leonard A. Carbary
BY
Harness, Talburtt & Baldwin
ATTORNEYS.

CIRCUIT CONTROLLER FOR CONCEALED HEADLAMP ACTUATOR APPARATUS

BACKGROUND OF THE INVENTION

This invention relates to headlamp concealment apparatus for motor vehicles and, more particularly, to a fail-safe form of electrical circuit controller for controlling the operation of such apparatus.

The invention seeks generally to provide an improved form of electric circuit controller for an electrically operated actuator of a motor vehicle headlamp concealment apparatus and specifically to provide such a controller that prevents inadvertent actuation of the headlamp concealment apparatus and blocking out of illumination from the headlamps while the vehicle is in operation.

Related objects are to provide an improved circuit controller of the above character that is of relatively simple and inexpensive construction and may be readily incorporated in vehicle wiring circuitry.

The invention both as to its organization and operation will be understood from the detailed description following the accompanying

DESCRIPTION OF THE PREFERRED EMBODIMENT

Figure 2:
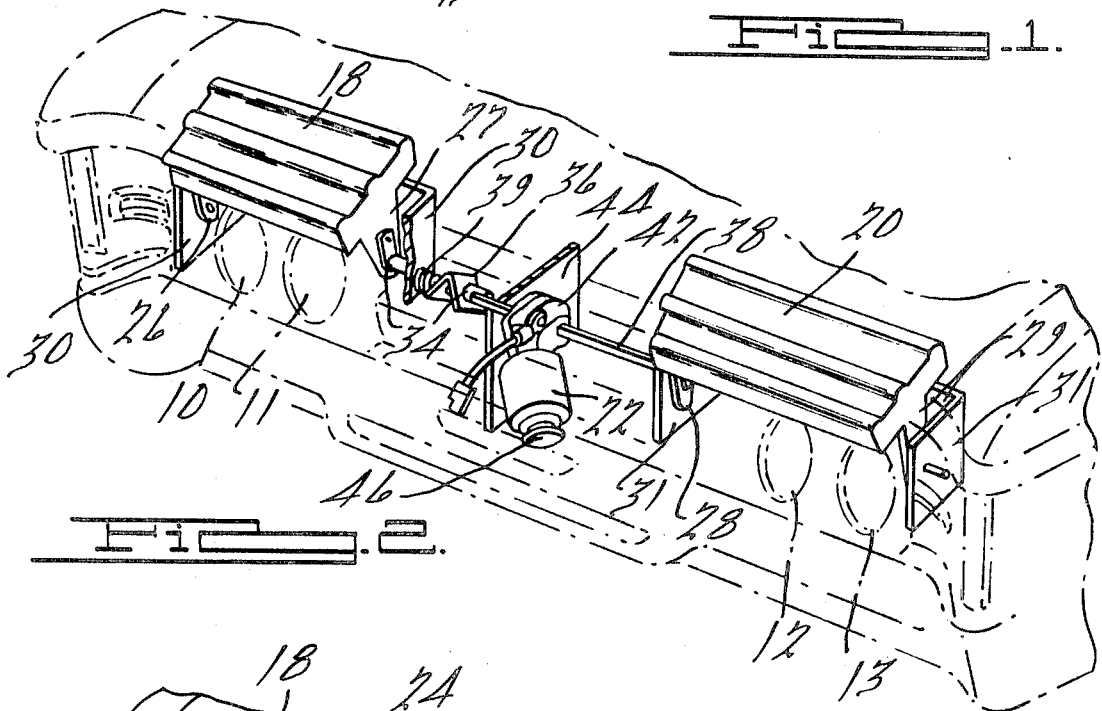
FIG. 2 is a perspective view with parts broken away of a portion of a motor vehicle equipped with a concealed headlamp actuator apparatus shown in its open or headlamp revealing position.
Figure 3:
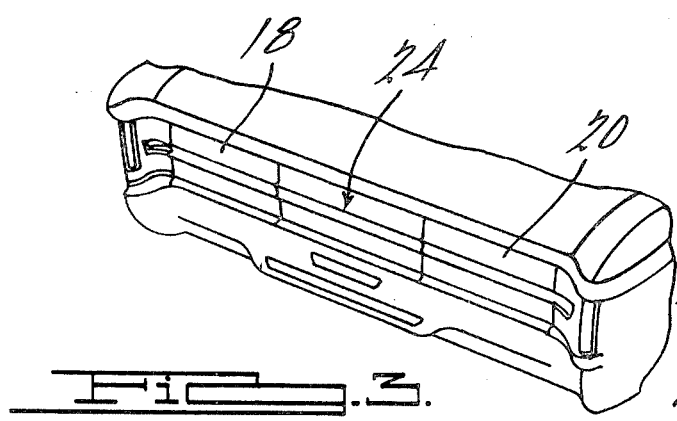
FIG. 3 is a perspective view illustrating the headlamp concealment apparatus in its closed or headlamp concealing position.

The headlamp concealment apparatus will be first and briefly described with reference to FIGS. 2 and 3 of the drawings showing a motor vehicle equipped with multiple headlamps 10, 11, 12 and 13. The headlamp concealment apparatus 16 is shown as comprising a pair of rotatable flaps or doors 18 and 20 which are actuated by a single reversible electrical motor 22 between an elevated or retracted open position in which the headlamps are revealed as shown in FIG. 2 and a lowered or closed position in which the headlamps are concealed as shown in FIG. 3.

Figure 1:
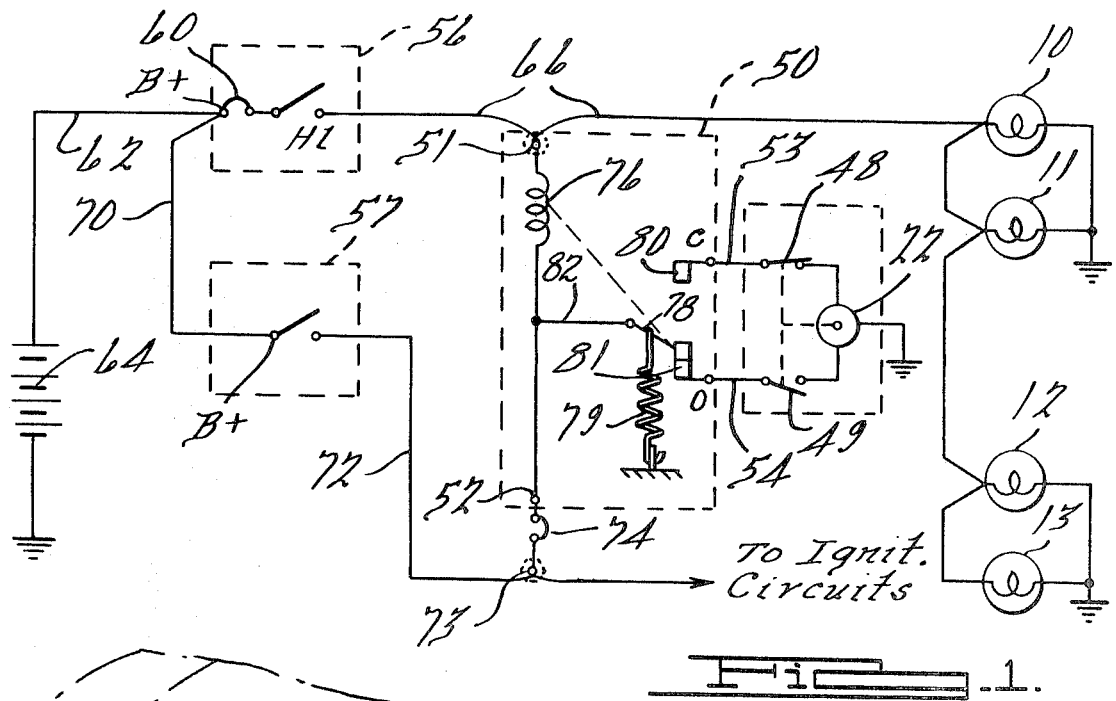
FIG. 1 is a schematic electrical circuit diagram of an electrical circuit controller for an electrically operated motor vehicle headlamp concealment apparatus in accordance with the invention.

The doors, which are constructed to conform with and are part of the vehicle grille assembly 24, include spaced-apart lever arm portions 26, 27 and 28, 29 of which the outboard arms 26 and 29 are pivotally supported from stationary structural support plates or housing members 30 and 31. The inboard arms 27, 28 are fastened to slotted crank elements as 34, which extend through and are rotatably supported on the adjacent support plates or housing members 30, 31. The crank elements, only one of which is shown, are detachably coupled as by a clip 36 to the opposite ends of a torsion bar 38 each end of which has fastened thereto a torsion spring as 39 that biases or loads the doors shut in their lowered position and open in their retracted elevated position to prevent the doors from rattling. The torsion bar passes through and is driven by a gear box 42 from the motor 22, which is mounted on and supported from a vertically extending brace support 44. The motor has an adjustment hand wheel 46 at the lower end of the shaft thereof, the upper end of which is connected through a worm gear drive to the reduction gear box 42 and is equipped with internal limit switches 48, 49 which control the extent of rotation of the motor. The limit switches are oppositely electrically positioned or conditioned with limit switch 48 being closed and limit switch 49 open when the headlamp doors are open or retracted. The limit switches are in the opposite electrical condition or position from which they are shown in FIG. 1 when the doors are closed or fully lowered in the headlamp concealing position of the apparatus.

The motor 22 is of the series type wound with two separately energizable field windings having a common ground return terminal and is driven or rotatable in one direction or the other depending upon which field winding is energized. The direction of rotation of the motor 22 is controlled from a circuit controller 50 having a pair of input terminals 51, 52 and a pair of oppositely, selectively energizable or conditional outputs C and O which are connected over circuit conductors 53 and 54 to the ungrounded side of a different one of the field windings of the motor.

The input terminals 51,52 of the controller are connected to the vehicle headlight circuit and to the vehicle ignition circuit, which are respectively individually controlled by the vehicle headlamp switch 56 and the vehicle ignition switch 57. The headlamp switch is shown as including an internal circuit breaker 60 connected over circuit conductor 62 to the positive terminal of the vehicle electrical power source, which includes the vehicle battery 64 shown connected in a negative grounded electrical system. The headlamp load connected side of the headlamp switch is connected over supply conductor 66 which loops around and is electrically connected to controller input terminal 51 from which it continues its extent to and is connected to one side of the parallel connected headlamps, the other side of each of which is returned to ground. The input or B+ terminal of the ignition switch is connected over conductor 70 to the B+ input or line connected side of the headlamp switch and a circuit connection is taken from an output terminal thereof over conductor 72 which is connected to one side 73 of an external circuit breaker 74 and to the vehicle ignition circuit. The other side of the external circuit breaker is connected to input terminals 52 of the controller, which, like terminal 51, may be a threaded stud terminal, the external connection to which is made by a ring-type terminal that is fastened thereto by a nut and washer.

Internally, the controller 50 comprises a relay coil 76 and a contact arm 78 movable between a spaced pair of fixed contacts 80 and 81 connected to the output circuit connection terminals C and O, respectively. The common or movable contact arm 78 of the relay controller 50 is connected as by conductor 82 to the side of the relay coil 76 that is connected to the ignition switch, and is mechanically biased as by spring 79 against back contact 81 which is the normal position of these relay contacts in the deenergized condition of the relay.

OPERATION

With the ignition switch 57 closed and the headlamp switch 56 open, the relay coil 76 will be energized over a circuit traced from B+ or the positive side of the vehicle power source, conductors 62 and 70, the ignition switch 57, conductor 72, circuit breaker 74, relay coil 76, conductor 66 through the vehicle headlamps 10–13 to ground. The relay coil is thus energized to transfer its movable contact arm 78 from back contact 81 to front contact 80 and establish an energizing circuit to the motor in parallel with the relay coil as traced from B+ through the ignition switch, conductor 72, breaker 74, conductor 82, contacts 78 and 80, conductor 53 and limit switch 48 shown in its closed position. Controller output terminal C will be true or high at B+ potential and the motor 22 will be energized to drive the headlamp doors to their closed or towered position at which time limit switch 48 will then be opened and limit switch 49 closed.

It will be seen that energization of the relay through the ignition switch causes the headlamp doors to be driven to or to be maintained in their lowered, or closed position. While the energizing current for the relay is returned and flows through the headlamp, the impedance or resistance of the relay coil is about 50 ohms, which is sufficiently high as compared to the resistance of the headlamps to prevent sufficient current flow through the headlamps to excite any illumination from them. Substantially all of the B+ supply voltage is dropped across the relay coil which is connected in series circuit relation with the vehicle headlamps under these conditions.

With the ignition switch 57 closed and the headlamp switch 56 subsequently closed, both sides of the relay coil 76 will effectively have B+ potential applied thereto to produce a zero net potential difference thereacross and prevent any current flow therethrough, thereby deenergizing the relay. Spring 79 retracts the arm 78 to resume its position shown in which the opposite field winding of the motor 22 is energized through the ignition switch and relay contacts 78 and 81, conductor 54 and now closed limit switch 49. Output terminal C will then be low or disabled or disconnected from B+, while terminal O will be high or at B+ to drive the motor in a direction to retract the headlamp doors to their elevated or fully open position at which time the limit switch 49 will be open and limit switch 48 will be closed.

Subsequent opening of the headlamp switch 56 while the ignition switch is still closed removes the disabling or opposing potential or power from the headlamp switch connected side of the controller and permits the relay 76 to be reenergized to complete an energizing circuit to the other field winding of the motor to operate the doors to their lowered or fully closed position. Subsequent opening of the ignition switch 58 leaves the headlamp doors in their fully closed position.

It will be noted that with the ignition switch open and the headlamp switch closed, the relay coil 76 is effectively in series with the motor and that in the opposite or inverse situation with the ignition switch closed and the headlamp switch open, the relay coil is effectively in series with the headlamps. Although in each case the energizing current for the relay flows through the headlamps or the motor, the resistance of the relay coil is so much greater than that of the headlamps or motor, that substantially the full voltage of the power source will appear across the relay coil 76, leaving little or no voltage available to the series connected headlamps or motor neither of which will receive sufficient current to be powered. In the case where the ignition switch is closed and the headlamp switch is open, the relay coil is effectively in parallel with the motor so that the motor may receive its full energizing current for operation from the power source through the ignition switch.

Inasmuch as the relay coil is deenergized when the vehicle is in operation with both the ignition switch and headlamp switch closed, it will be appreciated that a loss of power in or to the control element or the actuator motor that would disable or prevent operation of the relay or the actuator motor will ıt cause the headlamp actuator to be actuated and block out the illumination from the headlamps inasmuch as the headlamp doors will already be open in their retracted or headlamp revealing position.

The claims:

1. The combination with an electrically operated headlamp concealing apparatus for a motor vehicle equipped with a source of electrical power, a headlamp circuit including a headlamp switch connected between the source and the vehicle headlamps, and an ignition circuit including an ignition switch connected to the source, said headlamp concealing apparatus including mechanism operable between a headlamp concealing position and a headlamp revealing position and electrically powered, directionally energizable and responsive actuating means mechanically coupled to said mechanism for actuating it in either direction between said positions in accordance with the direction of energization of said actuating means, of an electrical controller for said apparatus controlling the direction of energization of said actuator means, said controller having a pair of input circuit connections thereto paralleling the headlamp circuit and the ignition circuit from the headlamp switch and the ignition switch and a pair of oppositely switched and electrically conditioned output circuit connections to said actuating means for directional energization thereof from the power source through the ignition switch when only the ignition switch is closed and for opposite directional energization thereof when both the ignition switch and the headlamp switch are closed.

2. The combination in accordance with claim 1 wherein said controller includes a control element connected between said headlamp switch and said ignition switch and controlling the switching and the electrical condition of said output circuit connections.

3. The combination in accordance with claim 2 wherein said control element is a relay of high impedance value relative to the headlamps and the actuator means.

4. The combination in accordance with claim 3 wherein said relay is in series circuit relation with said headlamps when the ignition switch is closed and the headlamp switch is open.

5. The combination in accordance with claim 3 wherein said relay is in series circuit relation with said actuator means when the ignition switch is open and the headlamp switch is closed.

6. The combination in accordance with claim 3 wherein said relay is energized through said ignition switch when the ignition switch is closed and is effectively shunted out of the headlamp circuit by the headlamp switch when the headlamp switch is subsequently closed.

7. The combination in accordance with claim 3 wherein said relay is electrically energized from the source through the ignition switch when the ignition switch is closed and the headlamp switch is open and the headlamp concealing mechanism is in its headlamp concealing position and wherein the subsequent closing of the headlamp switch deenergizes the relay to position the headlamp concealing mechanism in its headlamp revealing position.

8. The combination in accordance with claim 1 wherein said controller includes a relay having a coil, a pair of spaced-apart fixed contacts and a contact biased against one of said fixed contacts and movable therefrom to the other fixed contact upon energization of the relay coil, and circuit means connecting the relay coil between the circuit completing sides of the headlamp switch and of the ignition switch, the movable contact to the side of the coil connected to the ignition switch, the said one of said fixed contacts to the actuating means for energization thereof in one direction from the source through the ignition switch when the headlamp switch is open, and the said other fixed contact to the actuating means for energization thereof in the other direction from the source through the ignition switch when the headlamp switch is closed.